United States Patent
Andrews et al.

(10) Patent No.: US 7,633,865 B2
(45) Date of Patent: Dec. 15, 2009

(54) NETWORK OPERATIONS CONTROL IN PACKET DATA NETWORKS

(75) Inventors: Daniel Matthew Andrews, New Providence, NJ (US); Piyush Gupta, Piscataway, NJ (US); Iraj Saniee, New Providence, NJ (US); Aleksandr Stolyar, Basking Ridge, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 509 days.

(21) Appl. No.: 11/655,613

(22) Filed: Jan. 19, 2007

(65) Prior Publication Data

US 2008/0175149 A1 Jul. 24, 2008

(51) Int. Cl.
*H04L 12/28* (2006.01)
*H04L 12/56* (2006.01)
*G06F 15/16* (2006.01)

(52) U.S. Cl. .................. 370/230; 370/235; 370/413; 709/232

(58) Field of Classification Search ......... 370/229–238, 370/400–411, 412–413; 709/223–244; 455/450–453
See application file for complete search history.

(56) References Cited

U.S. PATENT DOCUMENTS

| 7,260,064 | B2 * | 8/2007 | Basu et al. .................. 370/238 |
| 7,319,684 | B2 * | 1/2008 | Tamaki et al. ............... 370/337 |
| 2005/0286477 | A1 | 12/2005 | Gupta et al. |
| 2006/0087974 | A1 | 4/2006 | Ozer et al. |
| 2006/0203768 | A1 | 9/2006 | Stolyar |
| 2007/0076631 | A1 * | 4/2007 | Gupta et al. ................ 370/254 |
| 2007/0264932 | A1 * | 11/2007 | Suh et al. ................... 455/13.1 |
| 2008/0101398 | A1 * | 5/2008 | Ojala et al. ................. 370/412 |

FOREIGN PATENT DOCUMENTS

EP 1 710 963 A1 10/2006

OTHER PUBLICATIONS

U.S. Appl. No. 10/122,660, filed Oct. 17, 2006.
U.S. Appl. No. 11/241,684, filed Sep. 30, 2005.
Andrews, M., et al. "Optimal Utility Based Multi-User Throughput Allocation Subject to Throughput Constraints", INFOCOM '2005, Miami, Mar. 13-17.
Gupta, P., et al., "Optimal Throughput Allocation in General Random Access Networks", CISS '2006, Princeton, Mar. 22-24.
Gupta, P., et al., Random-Access Scheduling with Service Differentiation in Wireless Networks, INFOCOM '2005, Miami, Mar. 13-17.
Stolyar, A.L., "Maximizing Queueing Network Utility Subject to Stability: Greedy Primal-Dual Algorithm", Queueing Systems, 2005, vol. 50, No. 4, pp. 401-457.

(Continued)

*Primary Examiner*—Tri H Phan
(74) *Attorney, Agent, or Firm*—Harness, Dickey & Pierce

(57) ABSTRACT

A technique for controlling a packet data network to maintain network stability and efficiently utilize network resources through mechanisms involving per-destination queues and urgency weights for medium access control. The technique jointly controls congestion, scheduling, and contention resolution on hop-by-hop basis, such that the length of queues of packets at a node does not become arbitrarily large. In one embodiment, queue lengths and urgency weights may be transmitted and received via medium access control messages.

16 Claims, 11 Drawing Sheets

OTHER PUBLICATIONS

Garg, Priyank, et al., "Using IEEE 802.11e MAC for QoS Over Wireless", 2003 IEEE Int'l Performance, Computing & Communications Conference, Apr. 9-11, 2003.

Bhagwat, Pravin, et al., "Enhancing Throughput Over Wireless LANS Using Channel State Dependent Packet Scheduling", IEEE INFOCOM 1996, Mar. 24-28, 1996.

PCT International Search Report corresponding to PCT Patent Application PCT/US2007/020166 filed Sep. 18, 2007 (4 pages).

PCT Written Opinion of the International Searching Authority corresponding to PCT Patent Application PCT/US2007/020166 filed Sep. 18, 2007 (9 pages).

* cited by examiner

NETWORK OPERATIONS CONTROL IN PACKET DATA NETWORKS

BACKGROUND OF THE INVENTION

The present invention relates generally to packet data networks, and more particularly to mobile ad-hoc networks.

Packet data networks with a fixed infrastructure are widely deployed. In these networks, end-user devices communicate with each other by connecting via data links to edge devices, which serve as access points to a core packet data transport network. One example is a cellular data network in which a mobile handset (end-user device) connects via a radio channel (data link) to a base station (access point), which is then connected to an IP network (core network).

Under active development, however, are mobile ad-hoc networks (MANETs), in which end-user devices may, e.g., create a network on demand. The principal characteristics of a typical MANET are the following: (a) there is no fixed network infrastructure, (b) devices may operate simultaneously as both end-user devices and network routers, and (c) devices may enter and exit the network at will. There are various MANET architectures, including proprietary ones. In one example of a MANET, devices share a common radio channel via an IEEE 802.11 carrier sense multiple access with collision avoidance (CSMA/CA) access method. IEEE 802.11 comprises a family of protocols, which collectively will be referred to herein as '802.11'.

Existing network operations systems developed for administering networks with a fixed infrastructure are not adequate for MANETs. What is needed is a network control system which responds to dynamically changing network conditions and which efficiently utilizes network resources.

BRIEF SUMMARY

Some embodiments of the invention provide a method for controlling a packet data network to maintain network stability and efficiently utilize network resources through new mechanisms involving per-destination queues and urgency weights for medium access control. These embodiments jointly control congestion, scheduling, and contention resolution on hop-by-hop basis, such that the length of queues of packets at a node does not become arbitrarily large. The invention is applicable to MANETs and other packet data networks, inclusive of those with fixed infrastructures.

In accordance with an embodiment of the invention, a plurality of local per-destination queues are maintained by a node, and the queue lengths of these queues are transmitted to other nodes in the network. Queue lengths of per-destination queues of the other nodes are also received by the node. Urgency weights of the local per-destination queues are calculated based at least in part on the received queue lengths, and the calculated urgency weights are transmitted to the other nodes in the network. Similarly, urgency weights are received from other nodes. The urgency weights may be used for various purposes, for example controlling congestion, scheduling packets and resolving contention. In one embodiment, the queue lengths and urgency weights may be transmitted and received via medium access control messages.

These and other advantages of the invention will be apparent to those of ordinary skill in the art by reference to the following detailed description and the accompanying drawings.

DETAILED DESCRIPTION

Figure 1:
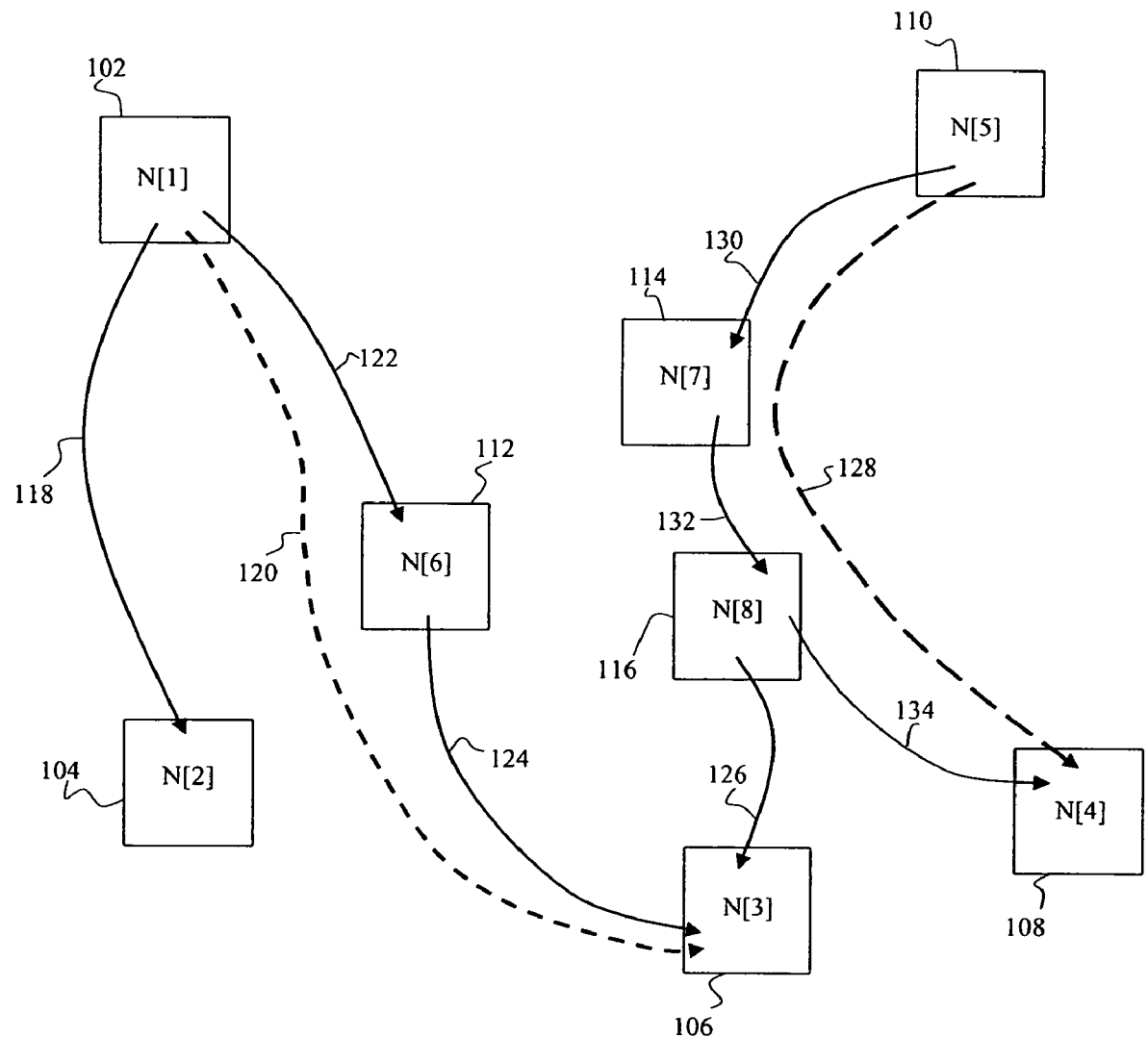
FIG. 1 shows an exemplary packet data network comprising multiple nodes.

FIG. 1 shows the basic architecture of a MANET comprising eight nodes, denoted N[1] 102-N[8] 116. Each node may serve as an end-user node, an intermediate network node, or simultaneously as both an end-user node and an intermediate network node. Examples of nodes in a MANET are mobile handsets, laptops outfitted with wireless modems, and personal digital assistants (PDAs) outfitted with wireless modems. Note that a MANET may also include fixed nodes such as wireless routers.

If two nodes can communicate directly with each other, they are referred to as one-hop neighbors. In FIG. 1, nodes N[1] 102 and N[2] 104 are connected by "link" 118, and are one-hop neighbors. Herein, "nodes are connected by a link" means that data may be transmitted directly from one to another. It does not refer to a physical connection across specific locations. Some links may be uni-directional, and some links may be bi-directional. As an example, nodes N[1] 102 and N[2] 104 may be two laptops outfitted with wireless modems configured to send data directly to each other in a peer-to-peer mode.

If two nodes are connected via a single intermediate node, they are referred to as two-hop neighbors. In FIG. 1, nodes N[1] 102 and N[3] 106 are connected via intermediate node N[6] 112. Nodes N[1] 102 and N[3] 106 are two-hop neighbors. The end-to-end route 120 connecting nodes N[1] 102 and N[3] 106 comprises two segments: link 122 connecting node N[1] 102 to intermediate node N[6] 112 and link 124 connecting intermediate node N[6] 112 to node N[3] 106. As an example, nodes N[1] 102 and N[3] 106 may be two laptops outfitted with wireless modems, and node N[6] 112 may be a wireless router which provides a data connection between the two.

Additional multi-hop neighbors are similarly defined. As a final example in FIG. 1, node N[5] 110 is connected to node N[4] 108 via intermediate nodes N[7] 114 and N[8] 116. Nodes N[5] 110 and N[4] 108 are three-hop neighbors. The end-to-end route 128 connecting nodes N[5] 110 and N[4] 108 comprises three segments: link 130 connecting node N[5] 110 to intermediate node N[7] 114, link 132 connecting intermediate node N[7] 114 to intermediate node N[8] 116, and link 134 connecting intermediate node N[8] 116 to node N[4] 108.

Figure 2:
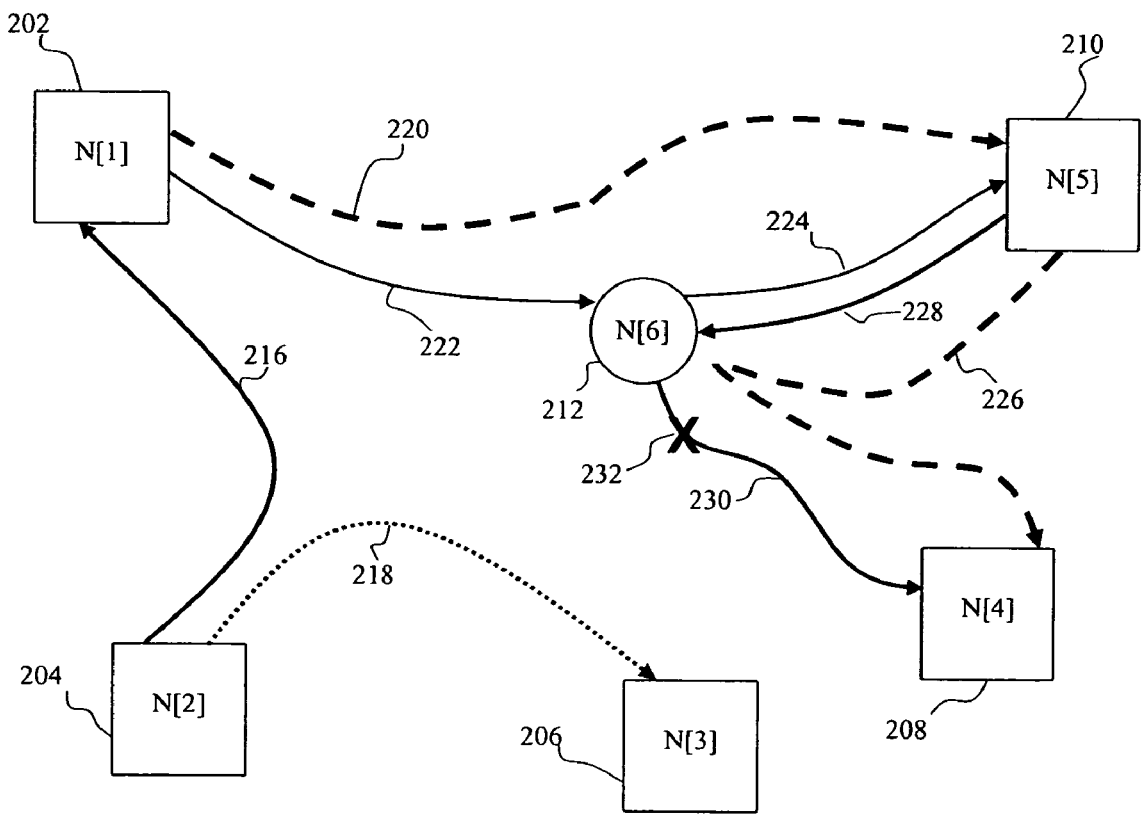
FIG. 2 shows multiple data flows through an exemplary packet data network.

FIG. 2 illustrates two examples of network problems which a network control system needs to address. FIG. 2 shows a network comprising six nodes, N[1] 202-N[6] 212. Node N[6] 212 is represented by a circle to highlight its role as an intermediate node. It is not necessarily physically different from the other nodes.

The first example compares two instances of data transmission between one-hop neighbors. In the first instance, data transmission occurs at high throughput; in the second instance, transmitted packets encounter heavy congestion. In the first instance, source node N[2] 204 sends packets directly to destination node N[1] 202 via link 216. Link 216 and destination node N[1] 202 have available capacity; consequently, data transfer occurs at high throughput. In the second instance, source node N[2] 204 attempts to send packets directly to destination node N[3] 206 via link 218. Link 218 is heavily loaded, however, and most of the packets get dropped.

The second example compares two instances of data transmission between two-hop neighbors. In the first instance, data transmission occurs at high throughput; in the second instance, there is a break in a link. In the first instance, source node N[1] 202 sends packets to destination node N[5] 210 via intermediate node N[6] 212. The end-to-end route 220 from source node N[1] 202 to destination node N[5] 210 comprises two segments: link 222 from source node N[1] 202 to intermediate node N[6] 212, and link 224 from intermediate node N[6] 212 to destination node N[5] 210. In this example, link 222, link 224, intermediate node N[6] 212, and destination node N[5] 210 all have available capacity; consequently, data transfer occurs at high throughput.

In the second instance, source node N[5] 210 attempts to send packets to destination node N[4] 208 via intermediate node N[6] 212. The end-to-end route 226 from source node N[5] 210 to destination node N[4] 208 comprises two segments: link 228 from source node N[5] 210 to intermediate node N[6] 212, and link 230 from intermediate node N[6] 212 to destination node N[4] 208. In this instance, there is a "break" in link 230, as depicted by the "X" at point 232; consequently, destination node N[4] 208 is unreachable from source node N[5] 210.

In the network shown in FIG. 2, the nodes are all configured with single queues; packets to all destinations are co-mingled. In the first example above, the connection between source node N[2] 204 and destination node N[1] 202 is capable of high data throughput; whereas, the connection between source node N[2] 204 and destination node N[3] 206 is heavily congested. Since there is a single queue in the source node N[2] 204, however, packets bound for destination N[1] 202 will be delayed waiting for packets bound for destination N[3] 206 to exit the queue. And, depending on the network protocol, source node N[2] 204 has no indication of problems with route 218 until it sends out packets and gets few acknowledgements back from the destination node.

In the second example above, the complete data route 220 between source node N[1] 202 and destination node N[5] 210 is capable of high data throughput; whereas, the complete data route 226 between source node N[5] 210 and destination node N[4] 208 is broken. Both routes pass through intermediate node N[6] 212. Since there is a single queue at intermediate node N[6] [212], packets bound for destination node N[5] 210 via link 224 will be delayed by co-mingled packets bound for destination node N[4] 208 via link 230. Additionally N[5] 210 will continue to transmit packets to intermediate node N[6] 212 until it receives no acknowledgements from destination node N[4] 208. Once again, network resources are not utilized efficiently.

Figure 3:
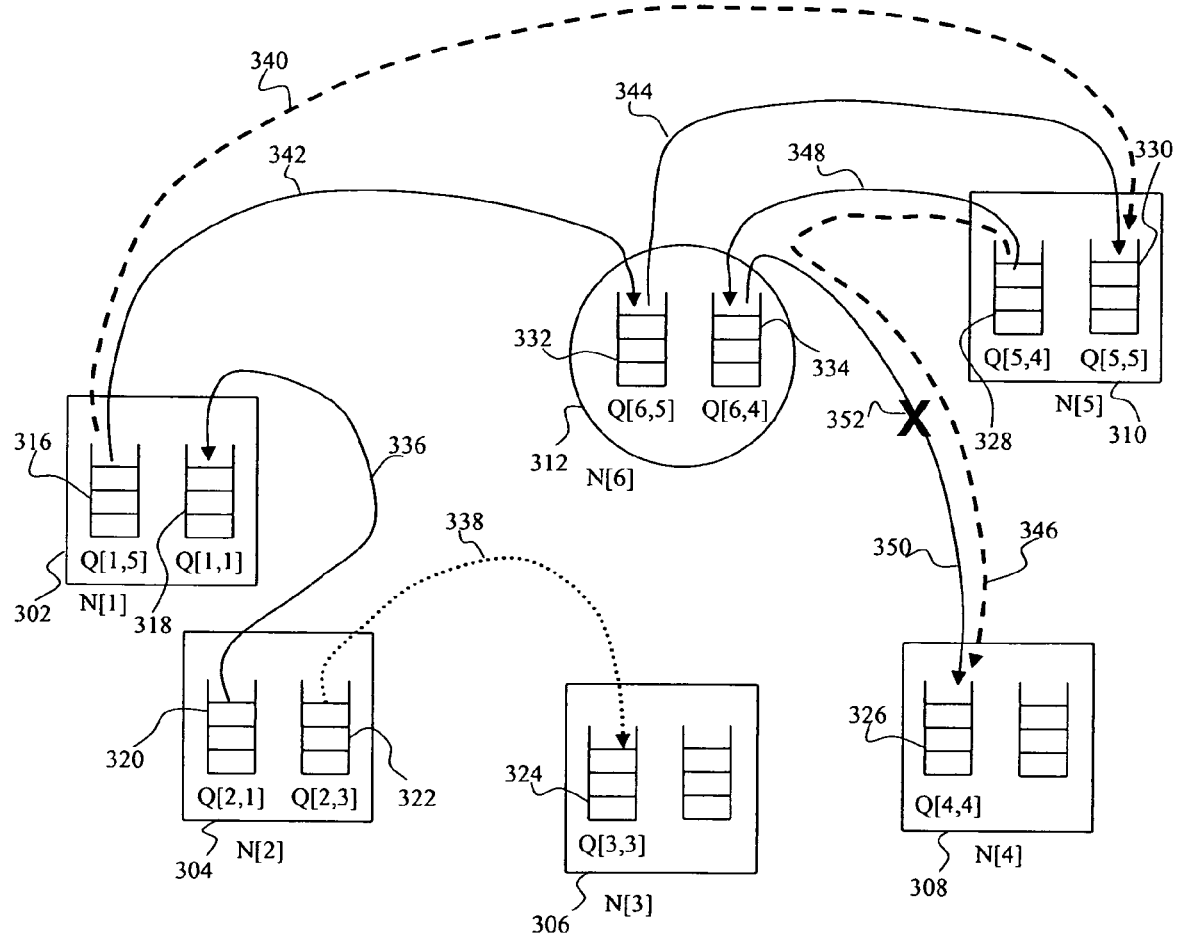
FIG. 3 shows nodes configured with multiple per-destination queues.

In the above examples, more efficient network operation can be achieved via per-destination queues. At a node, packets bound for different destinations are held in separate queues. FIG. 3 shows the same network and the same data flows shown in FIG. 2, except the nodes in FIG. 3 are configured with separate per-destination queues. These queues are denoted Q[X,Y], where X is the source or intermediate node and Y is the destination node.

Referring to FIG. 3, the first example, as in FIG. 2, compares the data flow from source node N[2] 304 to destination node N[1] 302 via lightly-loaded link 336 with the data flow from source node N[2] 304 to destination node N[3] 306 via heavily-congested link 338. With the per-destination queue configuration, packets at source node N[2] 304 bound for destination node N[1] 302 are maintained in queue Q[2,1] 320; whereas packets bound for destination node N[3] 306 are maintained in a separate queue Q[2,3] 322. As a consequence, the data throughput from queue Q[2,1] 320 to queue Q[1,1] 318 is not affected by the heavy congestion between queue Q[2,3] 322 and queue Q[3,3] 324.

Referring to FIG. 3, the second example, as in FIG. 2, compares the data flow over route 340 from source node N[1] 302 to destination node N[5] 310 via intermediate node N[6] 312 with the data flow over route 346 from source node N[5] 310 to destination node N[4] 308 via intermediate node N[6] 312. With the per-destination queue configuration at intermediate node N[6] 312, packets bound for destination node N[5] 310 are maintained in queue Q[6,5] 312; whereas packets bound for destination N[4] 308 are held in a separate queue Q[6,4] 334. As a consequence, packet transmission from queue Q[1,5] 316 via lightly-loaded link 342 to queue Q[6,5] 332 and from queue Q[6,5] 332 via lightly-loaded link 344 to queue Q[5,5] 330 is not disrupted by the packet transmission from queue Q[5,4] 328 via link 348 to queue Q[6,4] 334 and the attempted packet transmission from queue Q[6,4] 334 to Q[4,4] 326 via link 350, which is "broken," as depicted by the "X" at point 352.

Three primary functions of a network control system are congestion control, scheduling, and contention resolution. Congestion control regulates the packet transmission rate at the source node for a data flow. Scheduling regulates the sequence in which packets are transmitted. In networks in which nodes share a common channel, contention resolution determines which packet gets transmitted if more than one packet attempts to access the common channel at the same time. In an embodiment of the invention, a combination of per-destination queuing, urgency weight, and medium access control (MAC) protocols provides advantages for all three network control system functions.

Figure 4:
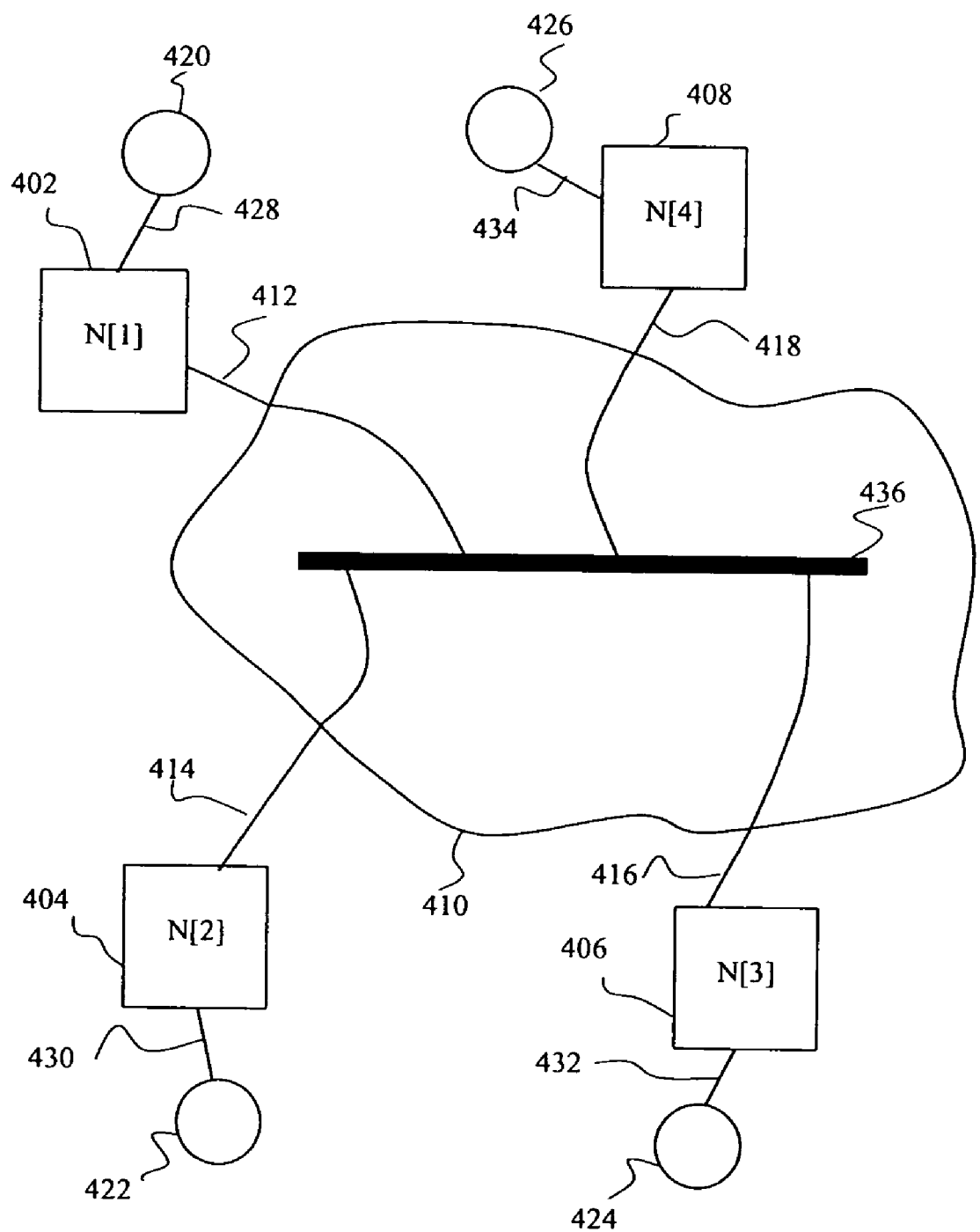
FIG. 4 shows three principal functions of network control.

As an example, FIG. 4 shows a packet data network comprising four nodes N[1] 402, N[2] 404, N[3] 406, N[4] 408. The nodes are connected to data transport network 410 via data links 412, 414, 416, 418. In FIG. 4, the data links connect to common shared channel 436. Also shown are data sources 420, 422, 424, 426 connected to nodes N[1] 402-N[4] 408 via connections 428, 430, 432, 434. Data source 420 for node N[1] 402, for example, may be a central processing unit within the node. Another example of a data source would be node N[2] 404 transmitting data to N[1] 402.

If data transport network 410 becomes heavily loaded, congestion may be reduced by reducing the rate at which the data sources inject data into the network. For data which is already in queues, scheduling controls the priority in which it is transmitted. In an 802.11 or similar contention-based network, contention resolution determines which packets get transmitted if data from more than one queue attempts to acquire the channel at the same time.

Figure 5A:
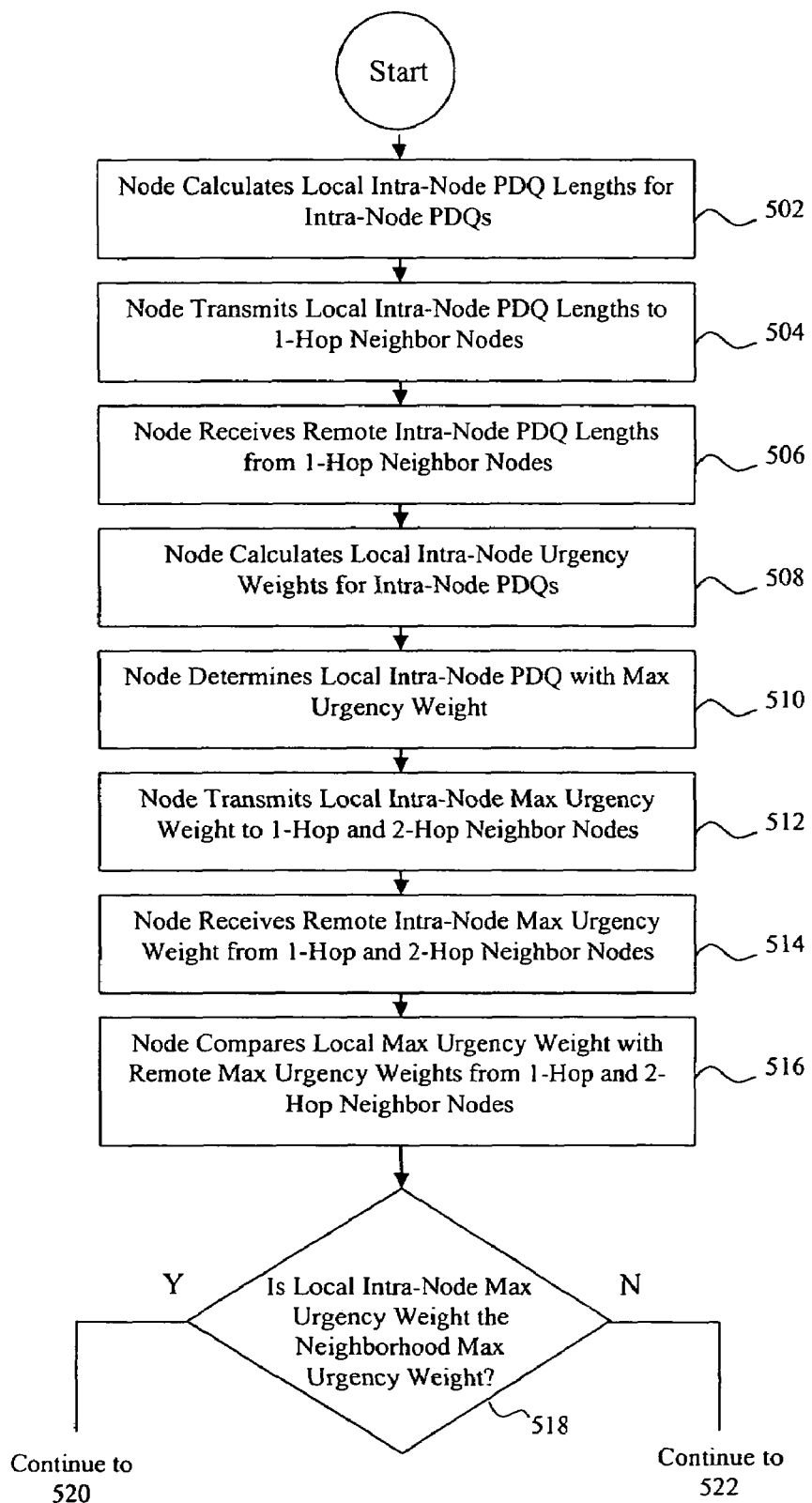
FIGS. 5A and 5B is a flowchart for a method of distributing per-destination queue lengths and urgency weights, and resolving contention.
Figure 5B:
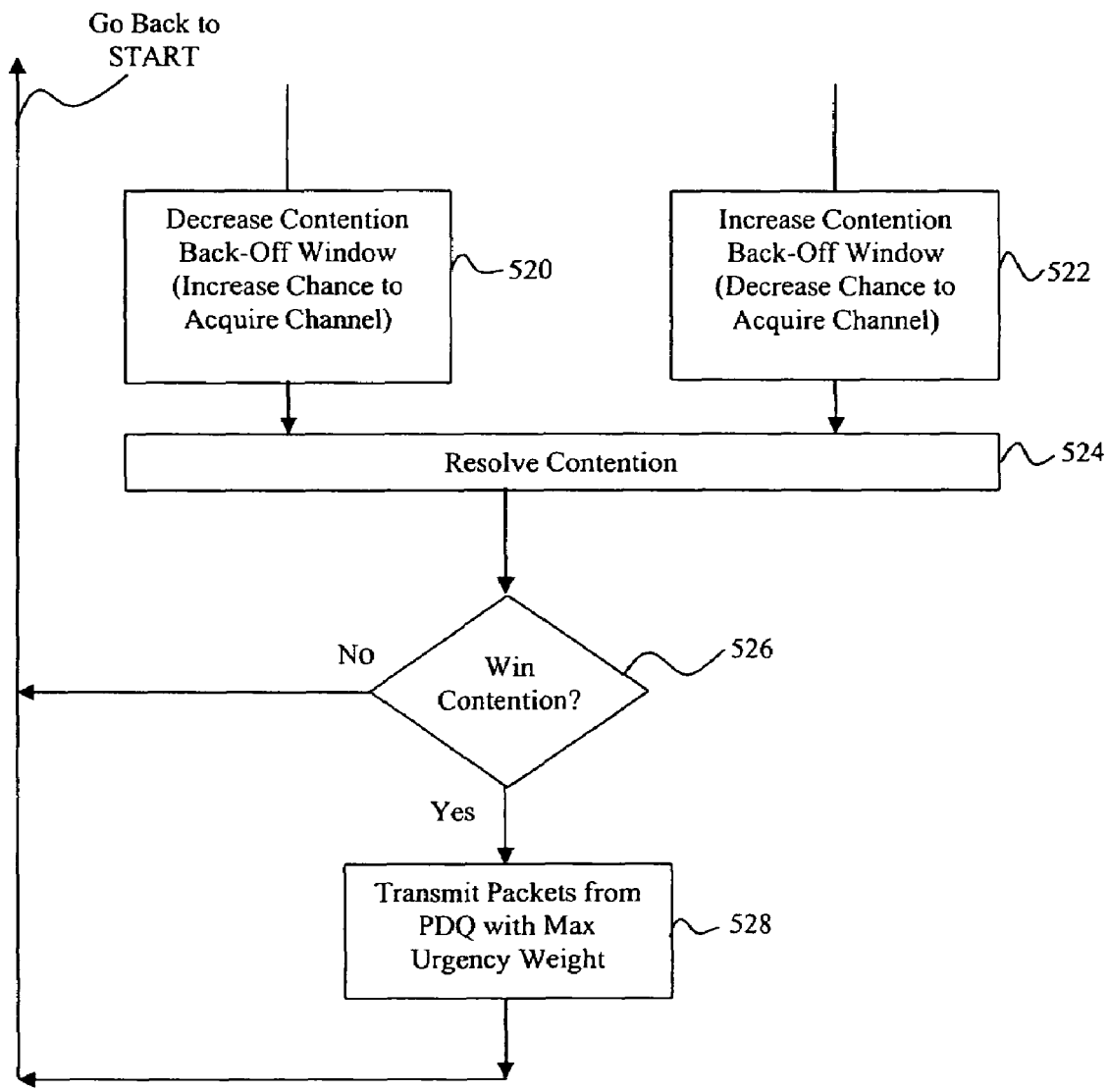

A detailed flowchart for an example of processes for scheduling and contention control is shown in FIG. 5A and FIG. 5B.

Herein, the following terms are used:

PDQ=Per-Destination Queue. In a node, packets bound for various destination nodes are maintained in separate queues, i.e., PDQs, corresponding to the destination nodes. A queue is denoted as Q[X,Y], where X is the source (or intermediate) node in which the queue is located, and Y is the destination node of packets stored therein.

PDQ Length. The number of packets in a PDQ. The PDQ length may also be expressed as a number of other data units therein, e.g., bits or bytes.

One-Hop Neighbor Nodes. For a specific reference node X=N, the one-hop neighbor nodes are the set of neighbor nodes that are one hop away from N.

Two-Hop Neighbor Nodes. For a specific reference node X=N, the two-hop neighbor nodes are the set of neighbor nodes that are two hops away from N.

Local Intra-Node PDQs. For a specific reference node X=N, the local node is N. Then, the local intra-node PDQs are the set $\{Q[X=N, Y=D(i)]\}$, for all i, i=1 . . . DMAX, where D(i) is a destination node for a packet in the same node N. The index i runs from 1 to DMAX, where DMAX is the maximum number of destinations for packets in N.

Remote Intra-Node PDQs. For a specific reference local node X=N, the remote nodes are the set $\{X=M\}$, where M comprises one-hop and two-hop neighbor nodes of N. For a specific remote node X=M, the remote intra-node PDQs are the set $\{Q[X=M, Y=(j)]\}$, for all j, j=1 . . . EMAX, where E(j) is a destination node for a packet in M. The index j runs from 1 to EMAX, where EMAX is the maximum number of destinations for packets in M.

Urgency Weight. A factor applied to a PDQ to determine the schedule for transmitting a packet from the PDQ. The urgency weight may be a function of PDQ lengths, packet ages, packet priorities, and other application-specific network parameters. Packets in a PDQ with a high urgency weight are typically scheduled for transmission before or with a higher probability than packets with a low urgency weight.

Signaling Messages. The signaling messages transmit PDQ lengths and urgency weights between nodes.

To calculate, transmit, and/or receive PDQ lengths and urgency weights, each node may execute a sequence of steps as shown in FIG. 5A and FIG. 5B. The PDQ lengths and urgency weights may be used by congestion control, scheduling, and contention-control processes, which will be discussed in further detail below.

In the steps below, the sequence of "transmit" followed by "receive" refers to the virtual process flow of a single node. In actual message exchanges, depending on the network architecture and protocols, some nodes may be transmitting while others are receiving. In a full-duplex mode, nodes may be simultaneously transmitting and receiving.

In Step 502, the node calculates its local intra-node PDQ lengths. PDQ length is one parameter used in calculating urgency weights. In Step 504, the node transmits its local intra-node PDQ lengths to its 1-hop neighbor nodes. The transmission mode will be discussed in further detail below. One skilled in the art can develop an embodiment of the invention wherein a node transmits its local intra-node PDQ lengths to its m-hop neighbor nodes, where m is greater than 1.

In Step 506, the node receives remote intra-node PDQ lengths from its 1-hop neighbor nodes. In Step 508, the node then uses the set of local and remote intra-node PDQ lengths as an input to calculate urgency weights for its local intra-node PDQs. The urgency weight may be dependent on local PDQ lengths, remote PDQ lengths, and other application-specific network parameters, such as delay time for Voice over IP transmission. An example of an urgency weight calculation is given below.

In Step 510, the node compares the urgency weights among its complete set of local intra-node PDQs and determines its intra-node maximum urgency weight. In Step 512, the node then transmits its intra-node maximum urgency weight to its 1-hop and 2-hop neighbor nodes. In Step 514, the node receives remote intra-node maximum urgency weights from its 1-hop and 2-hop neighbor nodes.

In Step 516, the node compares its local maximum urgency weight with remote maximum urgency weights from its 1-hop and 2-hop neighbor nodes. In Step 518, the node then determines whether its local intra-node maximum urgency weight is the highest maximum urgency weight within the neighborhood comprising itself, its 1-hop neighbor nodes, and its 2-hop neighbor nodes. Herein, the highest maximum urgency weight within the neighborhood comprising a node itself, its 1-hop neighbor nodes, and its 2-hop neighbor nodes, will be referred to as the neighborhood maximum urgency weight.

In this example, the network uses a contention-based, shared common channel protocol such as 802.11. However, one skilled in the art can develop embodiments of the invention for other network architectures and protocols. Referring to Step 518, if the node determines that its local intra-node maximum urgency weight is the neighborhood maximum urgency weight, the node decreases its contention back-off window in Step 520 as shown in FIG. 5B. If the node determines that its local intra-node maximum urgency weight is not the neighborhood maximum urgency weight, the node increases its contention back-off window in Step 522. Since the probability of a node acquiring the contention channel increases as the back-off window decreases, the process of decreasing the back-off window for the node with the neighborhood maximum urgency weight and increasing the back-off window for other nodes, strongly increases the probability that the node with the neighborhood maximum urgency weight will acquire the channel. There is still a finite probability, however, that more than one node will simultaneously attempt to acquire the channel. In this instance, contention is resolved in Step 524 by a protocol such as one described in one of the 802.11 standards.

Referring to Step 526, if the node does not acquire the channel, it does not transmit any packets and the process returns to start. If the node does acquire the channel, it transmits packets from the PDQ with the local intra-node maximum urgency weight (which in this instance is also the PDQ with the neighborhood maximum urgency weight). The process then returns to start to process the next packets to be transmitted.

The values of PDQ lengths and urgency weights are transmitted between nodes via signaling messages. In an embodiment of the invention, the messages are transmitted in the MAC layer. For 802.11 networks, in an embodiment of the invention, the values are embedded in the Request to Send/Clear to Send (RTS/CTS) messages. In light of the above disclosure, one skilled in the art can develop embodiments of the invention which transmit such signaling messages via protocols in other network layers. In light of the above disclosure, one skilled in the art can also easily develop embodiments of the invention which do not require signaling messages.

Urgency weights may be functions of queue sizes and application-specific parameters. For example, latency and jitter are key parameters for Voice over IP services. As another example, during administration of a cellular network, control messages may require priority over data traffic. Urgency weights may be passed to the MAC layer for packet scheduling, and the scheduler gives priority to data with high urgency weights.

Figure 6:
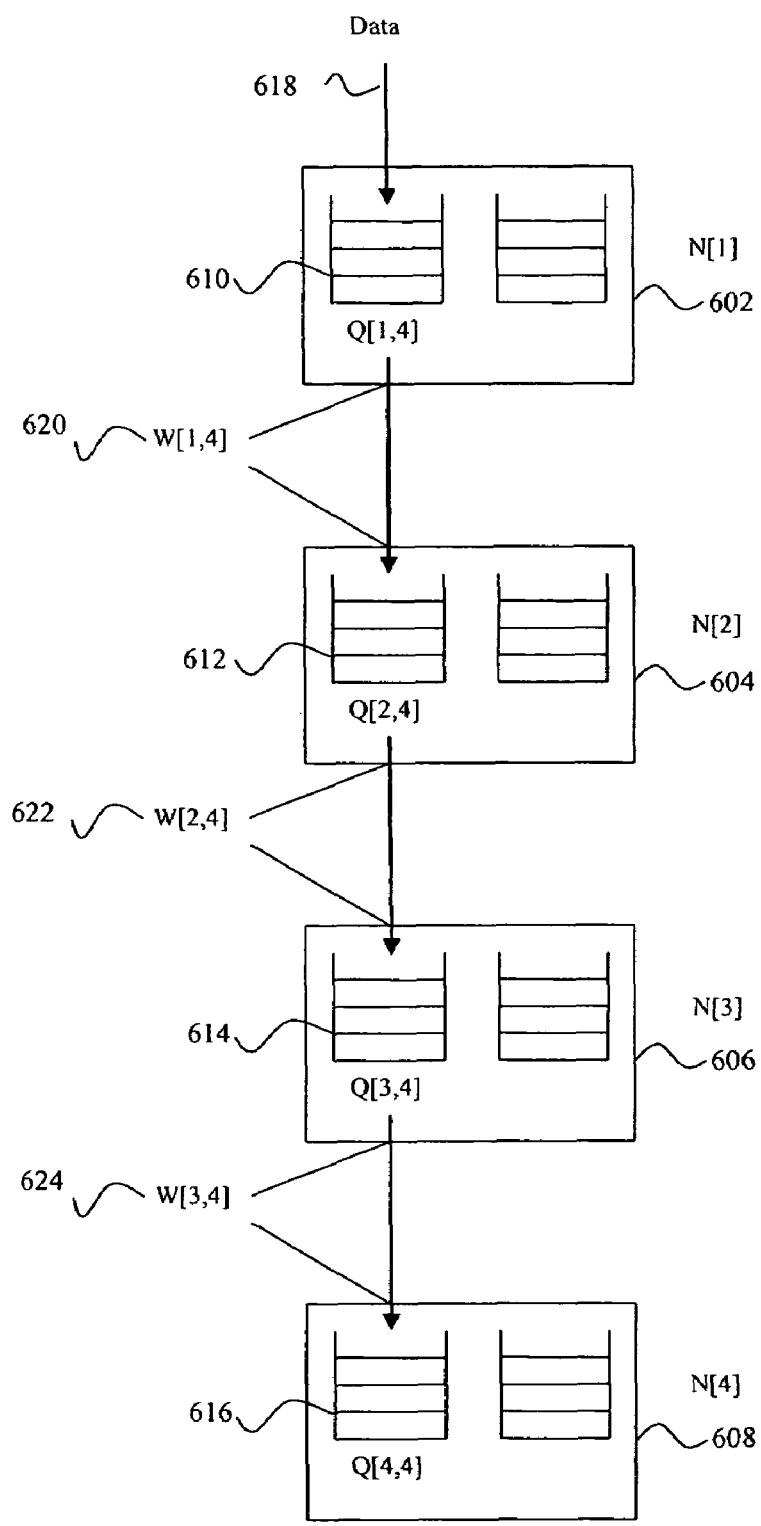
FIG. 6 shows an example for calculating urgency weight.

FIG. 6 illustrates an exemplary method for calculating an urgency weight. Data 618 is transmitted from source node N[1] 602 to destination node N[4] 608 via intermediate nodes N[2] 604 and N[3] 606. The following conventions are used: The queue at node X with destination node Y is denoted Q=[X,Y]; the length of the queue is denoted L{Q[X,Y]}; and the urgency weight of the queue is denoted W{Q[X,Y]}. At each node there may be a PDQ for packets being transmitted to destination node N[4]: Q[1,4] 610 in N[1] 602; Q[2,4] 612 in N[2] 604; Q[3,4] 614 in N[3] 606; and Q[4,4] 616 in N[4] 608.

If the specific application does not call for other requirements such as message priority and maximum packet delay times, then the urgency weight for a queue in a node may, e.g., be equal to the difference between the queue length in the node and the queue length in the next-hop node. In the example, then, $$W\{Q[1,4]\}=L\{Q[1,4]\}-L\{Q[2,4]\}$$

$$W\{Q[2,4]\}=L\{Q[2,4]\}-L\{[Q[3,4]\}$$

$$W\{Q[3,4]\}=L\{Q[3,4]\}-L\{[Q[4,4]\}.$$

For such applications, the goal is to keep queue sizes as small as possible; therefore, greater urgency is given to transmitting packets out of queues with long queue lengths while taking into account the queue length of the next-hop node. That is, adding packets to a queue which already has a long queue length is not desirable.

Figure 7A:
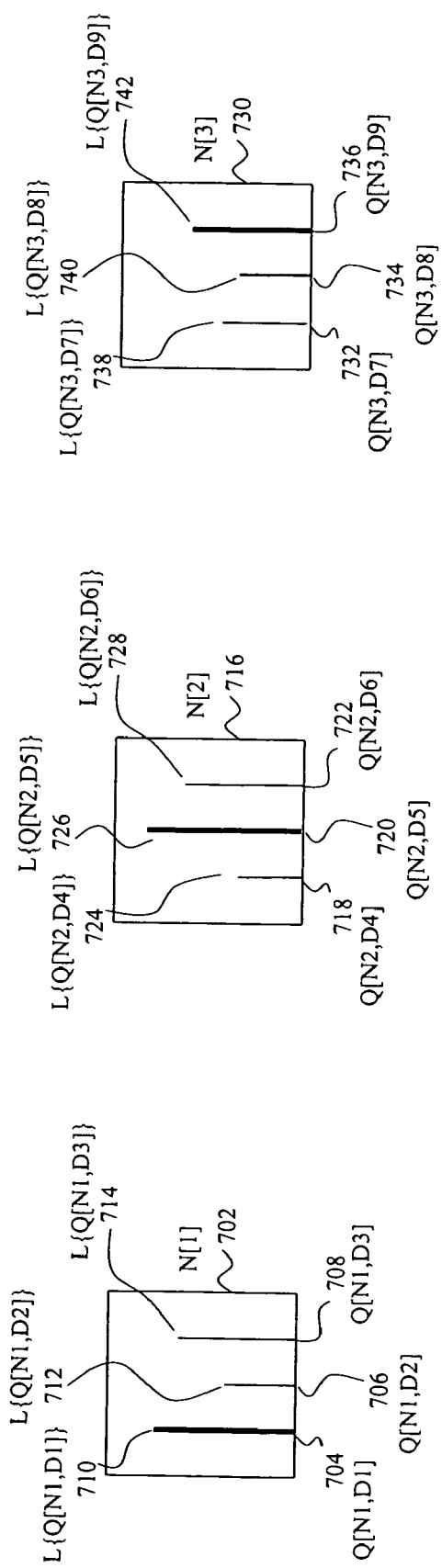
FIGS. 7A and 7B show an example for calculating, transmitting, and receiving per-destination queue lengths and urgency weights.
Figure 7B:
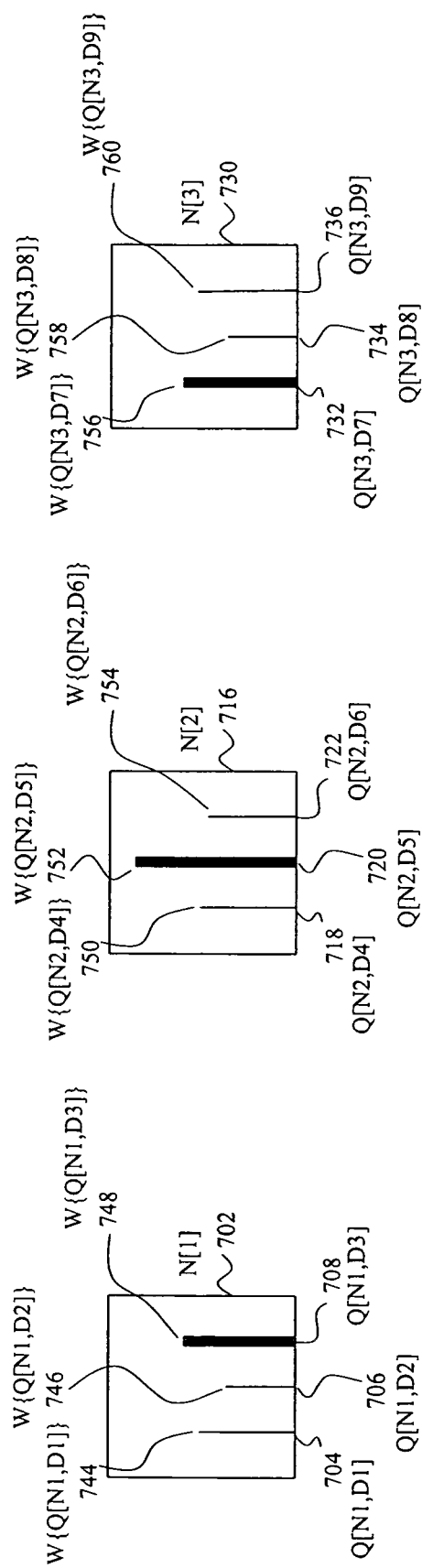

FIG. 7A. and FIG. 7B give examples of the processes shown in the flowchart in FIG. 5A and FIG. 5B. FIG. 7A and FIG. 7B shows a neighborhood comprising three nodes: N[1] 702, N[2] 716, and N[3] 730. Nodes N[1] 702 and N[2] 716 are one-hop neighbors. Nodes N[2] 716 and N[3] 730 are 1-hop neighbors. Nodes N[1] 702 and N[3] 730 are 2-hop neighbors.

Each node is configured with three PDQs. Node N[1] 702 is configured with Q[N1,D1] 704, Q[N1,D2] 706, and Q[N1,D3] 708. The notation follows the convention Q[N1,D1] =queue at node N[1] for packets bound for destination node N[D1]. In queues 704, 706, and 708, the height of each bar is drawn to be proportional to the corresponding queue length. The queue with the longest length is also shown as having a wider bar than the other two of the same node. In node N[1] 702, the queue length of queue Q[N1,D1] 704 is longest. The lengths of the queues in node N[1] 702 are denoted L{Q[N1,D1]} 710, L{Q[N1,D2]} 712, and L{Q[N1,D3]} 714. The corresponding queues and queue lengths for node N[2] 716 and node N[3] 730 are similarly denoted.

The example below will illustrate the corresponding steps of the method of the flowchart of FIG. 5A and FIG. 5B.

Corresponding to Step 502, each node calculates its local intra-node PDQ lengths for its intra-node PDQs; the results are:

Node N[1] has queues with queue lengths L{Q[N1,D1]}, L{Q[N1,D2]}, and L{Q[N1,D3]}

Node N[2] has queues with queue lengths L{Q[N2,D4]}, L{Q[N2,D5]}, and L{Q[N2,D6]}

Node N[3] has queues with queue lengths L{Q[N3,D7]}, L{Q[N3,D8]}, and L{Q[N3,D9]}.

Corresponding to Step 504, each node then transmits its set of intra-node queue lengths to its 1-hop neighbors; the results are:

Node N[1] transmits its set of local intra-node PDQ lengths <L{Q[N1,D1]}, L{Q[N1,D2]}, L{Q[N1,D3]}> to node N[2]

Node N[2] transmits its set of local intra-node PDQ lengths <L{Q[N2,D4]}, L{Q[N2,D5]}, L{Q[N2,D6]}> to node N[1] and node N[3].

Node N[3] transmits its set of local intra-node PDQ lengths <L{Q[N3,D7]}, L{Q[N3,D8]}, L{Q[N3,D9]}> to node N[2].

Corresponding to Step 506, each node receives the set of remote intra-node queue lengths from its 1-hop neighbors; the results are:

Node N[1] receives the set of remote intra-node PDQ lengths <L{Q[N2,D4]}, L{Q[N2,D5]}, L{Q[N2,D6]}> from node N[2];

Node N[2] receives the set of remote intra-node PDQ lengths <L{Q[N1,D1]}, L{Q[N1,D2]}, L{Q[N1,D3]}> from node N[1]; and receives the set of remote intra-node PDQ lengths <L{Q[N3,D7]}, L{Q[N3,D8]}, L{Q[N3,D9]}> from node N[3].

Node N[3] receives the set of remote intra-node PDQ lengths <L{Q[N2,D4]}, L{Q[N2,D5]}, L{Q[N2,D6]}> from node N[2].

Corresponding to Step 508, once each node has the complete set of local and remote PDQ lengths, it calculates the urgency weight of each of its intra-node PDQs. Note that PDQ lengths may be one of several sets of parameters used for calculating urgency weight. Each node may be pre-programmed with weighting factors for other parameters such as latency and message priority and constraints such as minimum data rate. As a result, it is possible that a PDQ with the longest PDQ length may have the lowest urgency weight.

As shown in FIG. 7B, the urgency weights of the queues in node N[1] 702 are denoted W{Q[N1,D1]} 744, W{Q[N1,D2]} 746, and W{Q[N1,D3]} 748. The notation follows the convention W{Q[N1,D1]}=urgency weight of queue at node N[1] for packets bound for destination node N[D1]. The height of each bar in queues 704, 706, and 708 has been drawn to be proportional to the corresponding urgency weight. The queue with the highest urgency weight has been shown as having a wider bar than the other two queues of the same node. In node N[1] 702, the urgency weight of queue Q[N1,D3] 708 is the highest. Note that in FIG. 7A, however, Q[N1,D1] 704 has the longest queue length. The corresponding urgency weights for node N[2] and node N[3] are similarly denoted.

The following are the results of Step 508:

Node N[1] has queues with urgency weights W{Q[N1,D1]}, W{Q[N1,D2]}, and W{Q[N1,D3]}

Node N[2] has queues with urgency weights W{Q[N2,D4]}, W{Q[N2,D5]}, and W{Q[N2,D6]}

Node N[3] has queues with urgency weights W{Q[N3,D7]}, W{Q[N3,D8]}, and W{Q[N3,D9]}.

Corresponding to Step 510, each node calculates the maximum urgency weight among its set of intra-node queues. In this example, the results are:

The intra-node maximum urgency weight in node N[1] is WMAX[N1]=W{Q[N1,D3]}

The intra-node maximum urgency weight in node N[2] is WMAX[N2]=W{Q[N2,D5]}

The intra-node maximum urgency weight in node N[3] is WMAX[N3]=W{Q[N3,D7]}.

Corresponding to Step 512, each node transmits its intra-node maximum urgency weight to the other two nodes; the results are:

Node N[1] transmits WMAX[N1] to node N[2] and node N[3].

Node N[2] transmits WMAX[N2] to node N[1] and node N[3].

Node N[3] transmits WMAX[N3] to node N[1] and node N[2].

Corresponding to Step 514, each node receives the remote intra-node maximum urgency weights from the other two nodes; the results are:

Node N[1] receives WMAX[N2] from node N[2] and WMAX[N3] from node N[3]

Node N[2] receives WMAX[N1] from node N[1] and WMAX[N3] from node N[3]

Node N[3] receives WMAX[N1] from node N[1] and WMAX[N2] from node N[2].

Corresponding to Step 516, each node compares its local intra-node maximum urgency weight with the remote intra-node maximum urgency weights from the other two nodes; the results are:

Node N[1] compares WMAX[N1], WMAX[N2], and WMAX[N3];

Node N[2] compares WMAX[N1], WMAX[N2], and WMAX[N3]; and

Node N[3] compares WMAX[N1], WMAX[N2], and WMAX[N3].

Corresponding to Step 518, each node determines whether its local intra-node maximum urgency weight is the neighborhood maximum urgency weight; the results are:

Node N[1] determines that WMAX[N1] is not the maximum value of the set {WMAX[N1], WMAX[N2], WMAX[N3]}, Node N[2] determines that WMAX[N2] is the maximum value of the set {WMAX[N1], WMAX[N2], WMAX[N3]}, and Node N[3] determines that WMAX[N3] is not the maximum value of the set {WMAX[N1], WMAX[N2], WMAX[N3]}.

Corresponding to Step 520 and Step 522, the contention windows of the queues with the local intra-node maximum urgency weight are adjusted; the results are:

Contention back-off window for Q[N2,D5] is decreased,

Contention back-off window for Q[N1,D3] is increased, and

Contention back-off window for Q[N3,D7] is increased.

Corresponding to Step 524, contention between packets attempting to acquire the shared common channel at the same time is probabilistically resolved.

Corresponding to Step 526, the result is that Q[N2,D5] acquires the channel.

Corresponding to Step 528, packets from Q[N2,D5] are transmitted.

An embodiment of the invention uses per-destination queues and urgency weights for congestion control. Congestion control refers to control of the data rate of a data flow while meeting application-specific requirements and constraints.

In one method of congestion control, the source node receives information on the status of downstream routes and nodes via explicit signaling messages transmitted from downstream nodes. Signaling messages, however, require extra processing and load on the network nodes and extra load on the network routes.

With per-destination queues and urgency weights, signaling messages may also be avoided. The per-destination queues and urgency weights defined throughout the data network cause network status information from downstream nodes to be coupled into the PDQs and urgency weights of an upstream node. The PDQs and urgency weights in the source node alone can be used to indicate and control congestion. In an embodiment of the invention, the injection rate of new packets into a flow depends on the PDQs only at the source, not at other network nodes.

Figure 8:
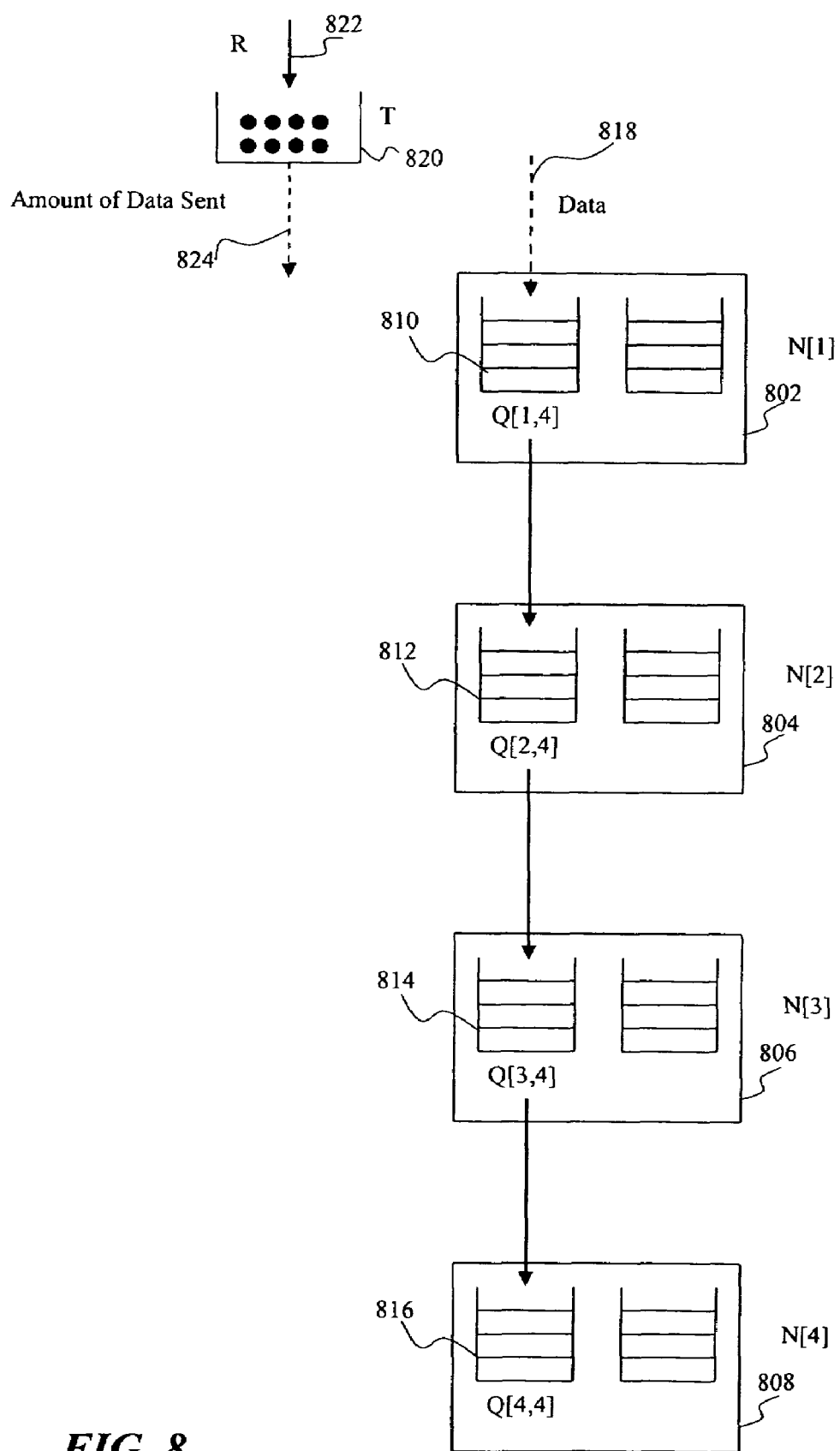
FIG. 8 shows an example of congestion control.

FIG. 8 illustrates an example of congestion control method in a packet data network. FIG. 8 shows four nodes denoted N[1] 802-N[4] 808. Data 818 is transmitted into source node N[1] 802 and transmitted to destination N[4] 808 via intermediate nodes N[2] 804 and N[3] 806. Each node is configured with per-destination queues for destination node N[4]. These queues are denoted Q[1,4] 810-Q[4,4] 816, where Q[Y, 4] refers to the per-destination queue at node Y with the destination N[4].

In this example, there is an additional optional constraint that must be met for one specific application. The constraint is that the flow rate must be greater than or equal to a minimum rate R 822. An embodiment of the invention uses a token bucket T 820 at the source node N[1] 802.

In the example of FIG. 8, R=minimum required data rate; T=token bucket for data flow fed at rate R and drained at the injection rate of data into Q[1,4]; and X=current average rate of the data flow. For congestion control, a new packet is sent when U'(X)−cL{Q[1,4]}+cT>0, where U is the utility function of the network, U'(X) is the first derivative of U with respect to X, c is a constant, and L{Q[1,4]} is the length of Q[1,4]. Note that the status of downstream routes and nodes is contained solely on the information in Q[1,4]. A discussion of the utility function may be found, e.g., in U.S. patent application Ser. No. 11/073,513, filed by A. Stolyar on Mar. 7, 2005, which is incorporated by reference herein in its entirety.

Figure 9:
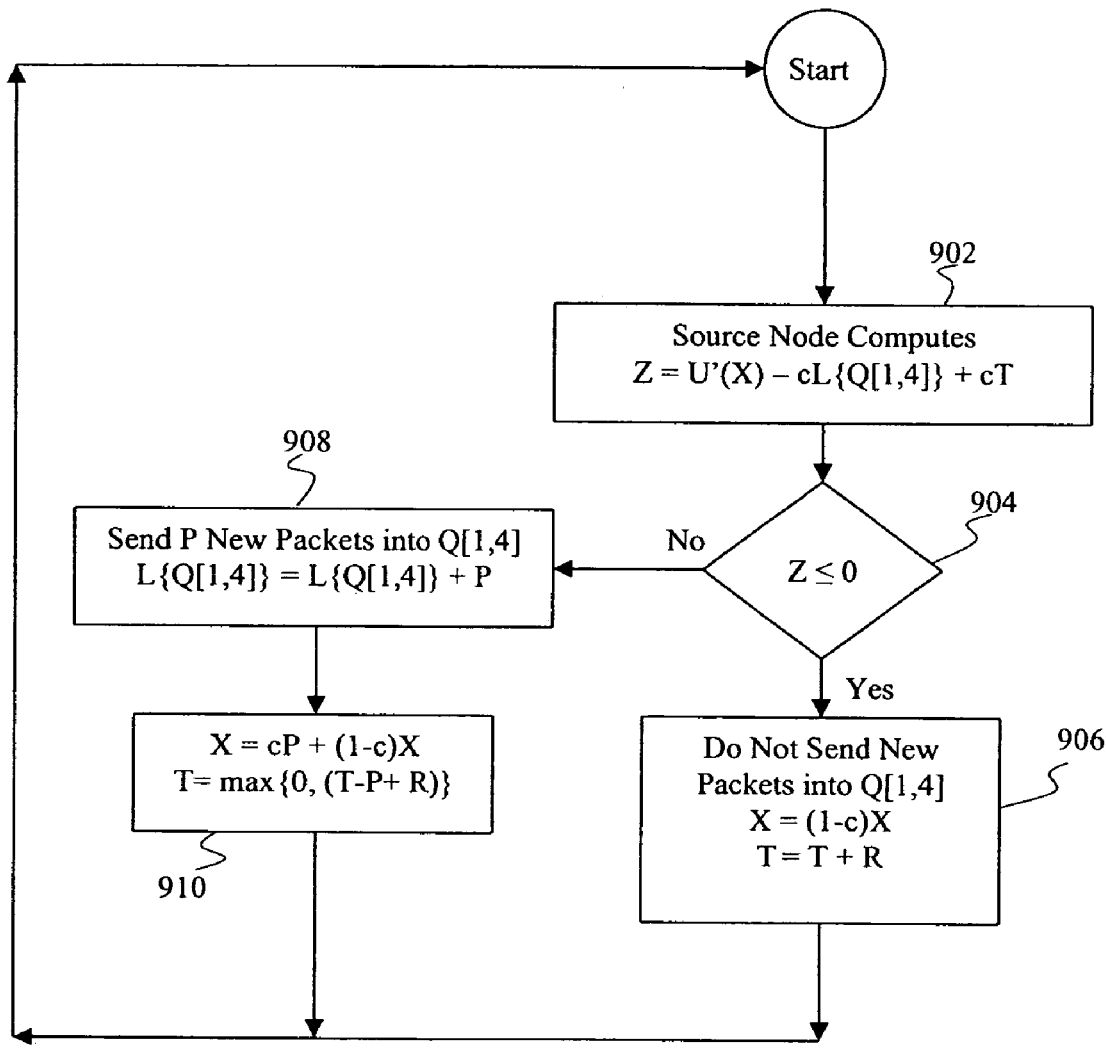
FIG. 9 is a flowchart illustrating an example of congestion control.

FIG. 9 is a flowchart of the congestion control process shown in FIG. 8. In Step 902, the source node calculates the value Z=U'(X)−cL{Q[1,4]}+cT.

Step 904 determines whether new packets are transmitted or not. If Z is <0, then in Step 906, no new packets are injected into Q[1,4]; the value of X is updated to X=(1−c)X; the value of T is updated to T=T+R; and the process returns to Step 902.

If Z is >0, then in Step 908, the quantity P new packets are sent into Q[1,4]; as a consequence, the PDQ length increases; the value of L{Q[1,4]} is updated to L{Q[1,4]}=L{Q[1,4]}+P In Step 910, the value of X is updated to X=cP+(1−c)X; the value of T is updated to T=max{0,(T−P+R)}; and the process returns to Step 902.

One skilled in the art may apply the embodiments of the invention to congestion control under other network conditions and constraints.

An embodiment for exchanging urgency weights information among nodes in a 2-hop neighborhood uses a mechanism which requires a constant overhead of two pieces of information in each data packet transmission, irrespective of the neighborhood size.

The following notation is used to describe this embodiment.

W(i): current urgency weight of node i,

I(i): 1-hop neighborhood of i, and

"e" before a variable indicates "local" estimate of the corresponding variable (e.g., eW(i) is an estimate of W(i)).

Let $T(i)=\max\_\{j\in I(i)\} W(j)$ denote the maximum urgency in node i's 1-hop neighborhood I(i). Further, let $V(i)=\max\_\{j\in I(i)\} T(j)$, which is the maximum urgency in the 2-hop neighborhood of node i. Then, an embodiment of exchange mechanism is as follows:

1. Each node i includes two pieces of information in every data packet it transmits: W(i) and eT(i).
2. Each node k on hearing a data packet transmission from node i updates its estimates as follows:

$$eT(k)=\max\{eT(k), W(i)\},$$

$$eV(k)=\max\{eV(k), eT(i)\}.$$

Here, eV(k) is an estimate of the maximum urgency weight in the 2-hop neighborhood of node k, which is used by node k to decide whether to access the channel in the next slot or not.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for control of a packet data network node comprising:
   maintaining a plurality of local per-destination queues;
   transmitting queue lengths of said plurality of local per-destination queues to at least one other node in said packet data network;
   receiving queue lengths of remote per-destination queues from at least one other node in said packet data network;
   calculating an urgency weight of each of said plurality of local per-destination queues based at least in part on said received queue lengths of said remote per-destination queues;
   transmitting said calculated urgency weights to at least one other node in said packet data network; and
   receiving urgency weights from at least one other node in said packet data network.

2. The method of claim 1, further comprising the step of controlling congestion of said packet data network based at least in part on said urgency weights.

3. The method of claim 1, further comprising the step of scheduling packets for transmission in said packet data network based at least in part on said urgency weights.

4. The method of claim 1, further comprising the step of resolving contention of packets in a shared channel contention-based network based at least in part on said urgency weights.

5. The method of claim 1, wherein said steps of transmitting queue lengths and receiving queue lengths are performed using medium access control messages.

6. The method of claim 1, wherein said steps of transmitting said calculated urgency weights and receiving urgency weights are performed using medium access control messages.

7. The method of claim 1, wherein said packet data network is a mobile ad-hoc network.

8. Apparatus comprising:
   means for maintaining a plurality of local per-destination queues;
   means for transmitting queue lengths of said plurality of local per-destination queues to at least one other node in said packet data network;
   means for receiving queue lengths of remote per-destination queues from at least one other node in said packet data network;
   means for calculating an urgency weight of each of said plurality of local per-destination queues based at least in part on said received queue lengths of said remote per-destination queues;
   means for transmitting said calculated urgency weights to at least one other node in said packet data network; and
   means for receiving urgency weights from at least one other node in said packet data network.

9. The apparatus of claim 8, further comprising means for controlling congestion of said packet data network based at least in part on said urgency weights.

10. The apparatus of claim 8, further comprising means for scheduling packets for transmission in said packet data network based at least in part on said urgency weights.

11. The apparatus of claim 8, further comprising means for resolving contention of packets in a shared channel contention-based network based at least in part on said urgency weights.

12. The apparatus of claim 8 wherein said packet data network is a mobile ad-hoc network.

13. A computer readable storage medium storing computer program instructions for control of a packet data network node, said computer program instructions defining the steps of:
   maintaining a plurality of local per-destination queues;
   transmitting queue lengths of said plurality of local per-destination queues to at least one other node in said packet data network;
   receiving queue lengths of remote per-destination queues from at least one other node in said packet data network;
   calculating an urgency weight of each of said plurality of local per-destination queues based at least in part on said received queue lengths of said remote per-destination queues;
   transmitting said calculated urgency weights to at least one other node in said packet data network; and
   receiving urgency weights from at least one other node in said packet data network.

14. The computer readable storage medium of claim 13, said computer program instructions further defining the step of controlling congestion of said packet data network based at least in part on said urgency weights.

15. The computer readable storage medium of claim 13, said computer program instructions further defining the step of scheduling packets for transmission in said packet data network based at least in part on said urgency weights.

16. The computer readable storage medium of claim 13, said computer program instructions further defining the step of resolving contention of packets in a shared channel contention-based network based at least in part on said urgency weights.

* * * * *

UNITED STATES PATENT AND TRADEMARK OFFICE
CERTIFICATE OF CORRECTION

PATENT NO. : 7,633,865 B2 Page 1 of 1
APPLICATION NO. : 11/655613
DATED : December 15, 2009
INVENTOR(S) : Daniel Matthew Andrews et al.

It is certified that error appears in the above-identified patent and that said Letters Patent is hereby corrected as shown below:

Column 1, after the title and before "BACKGROUND OF THE INVENTION", insert the following paragraph:

-- ACKNOWLEDGEMENT OF GOVERNMENT SUPPORT
  The U. S. Government has a paid-up license in this invention and the right in limited circumstances to require the patent owner to license others on reasonable terms as provided for by the terms of Contract No. N66001-06-C-2021 awarded by the Defense Advanced Research Projects Agency. --.

Signed and Sealed this

Thirty-first Day of August, 2010

David J. Kappos
*Director of the United States Patent and Trademark Office*